US006883466B1

(12) United States Patent
Chambers

(10) Patent No.: US 6,883,466 B1
(45) Date of Patent: Apr. 26, 2005

(54) ANIMAL LEG WRAP

(76) Inventor: Glenn N. Chambers, 4001 S. Watt, #168, Sacramento, CA (US) 95823

(*) Notice: Subject to any disclaimer, the term of this patent is extended or adjusted under 35 U.S.C. 154(b) by 0 days.

(21) Appl. No.: 10/706,019

(22) Filed: Nov. 12, 2003

(51) Int. Cl.$^7$ .......................... A01K 15/02; A01K 29/00
(52) U.S. Cl. ...................... 119/850; 119/856; 119/857; 119/863; 119/865
(58) Field of Search ................................ 119/816, 850, 119/856, 857, 863, 865; 602/44, 65, 76, 78

(56) References Cited

U.S. PATENT DOCUMENTS

| | | | |
|---|---|---|---|
| 3,209,517 A | 10/1965 | Hyman | |
| 3,667,462 A | 6/1972 | Moon | |
| 3,882,867 A | 5/1975 | Moran | |
| 4,342,185 A | * 8/1982 | Pellew | ........................... 54/82 |
| 4,424,809 A | 1/1984 | Yovankin | |
| 4,538,602 A | 9/1985 | Shapiro | |
| 4,592,358 A | * 6/1986 | Westplate | .................... 607/112 |
| 4,685,278 A | 8/1987 | Mitsuoka | |
| 4,834,079 A | * 5/1989 | Benckhuijsen | ................. 602/2 |
| D325,637 S | * 4/1992 | O'Brien et al. | ............. D24/206 |
| 5,107,827 A | 4/1992 | Boyd | |
| 5,152,285 A | 10/1992 | Gnegy | |
| 5,618,263 A | * 4/1997 | Alivizatos | ....................... 602/6 |
| 5,697,962 A | * 12/1997 | Brink et al. | ................. 607/108 |
| 5,910,126 A | * 6/1999 | Wilson et al. | ................. 602/75 |

* cited by examiner

*Primary Examiner*—Teri Pham Luu
*Assistant Examiner*—Bret Hayes
(74) *Attorney, Agent, or Firm*—Thomas R. Lampe

(57) ABSTRACT

A leg wrap for wrapping a leg of an animal includes an inner wrapping sheet of flexible material, an outer wrapping sheet of flexible material, and soft, resilient filler material disposed between the inner wrapping sheet and the outer wrapping sheet. Stitching extends through the inner and outer wrapping sheets and the filler material securing the inner and outer wrapping sheets and the filler material together. The stitching forms a plurality of rectangular pillows having primary axes disposed perpendicular to the top edges and the bottom edges of the inner and outer wrapping sheets. Securement strips are releasably attached together to secure the leg wrap to the animal leg. The securement strips extend in the same direction as the lines of stitching and are placed to provide uniform tension along the leg whenever the leg wrap is used.

8 Claims, 4 Drawing Sheets

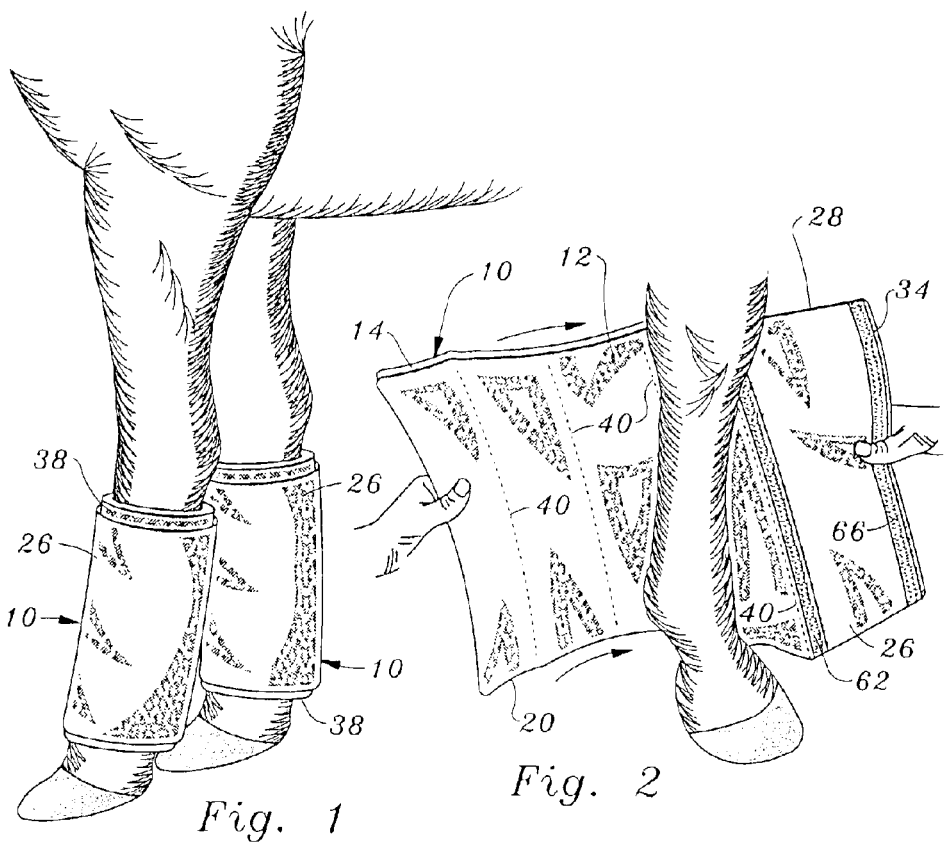
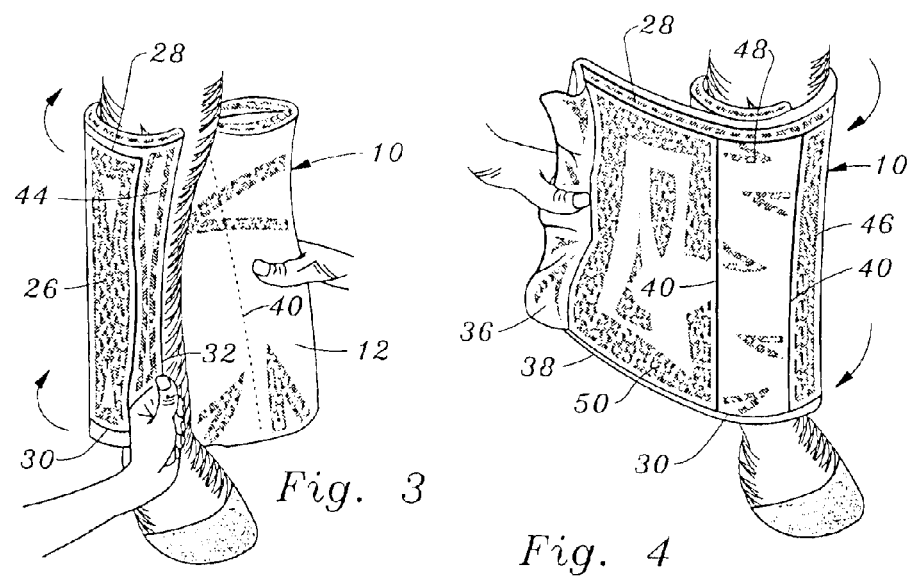

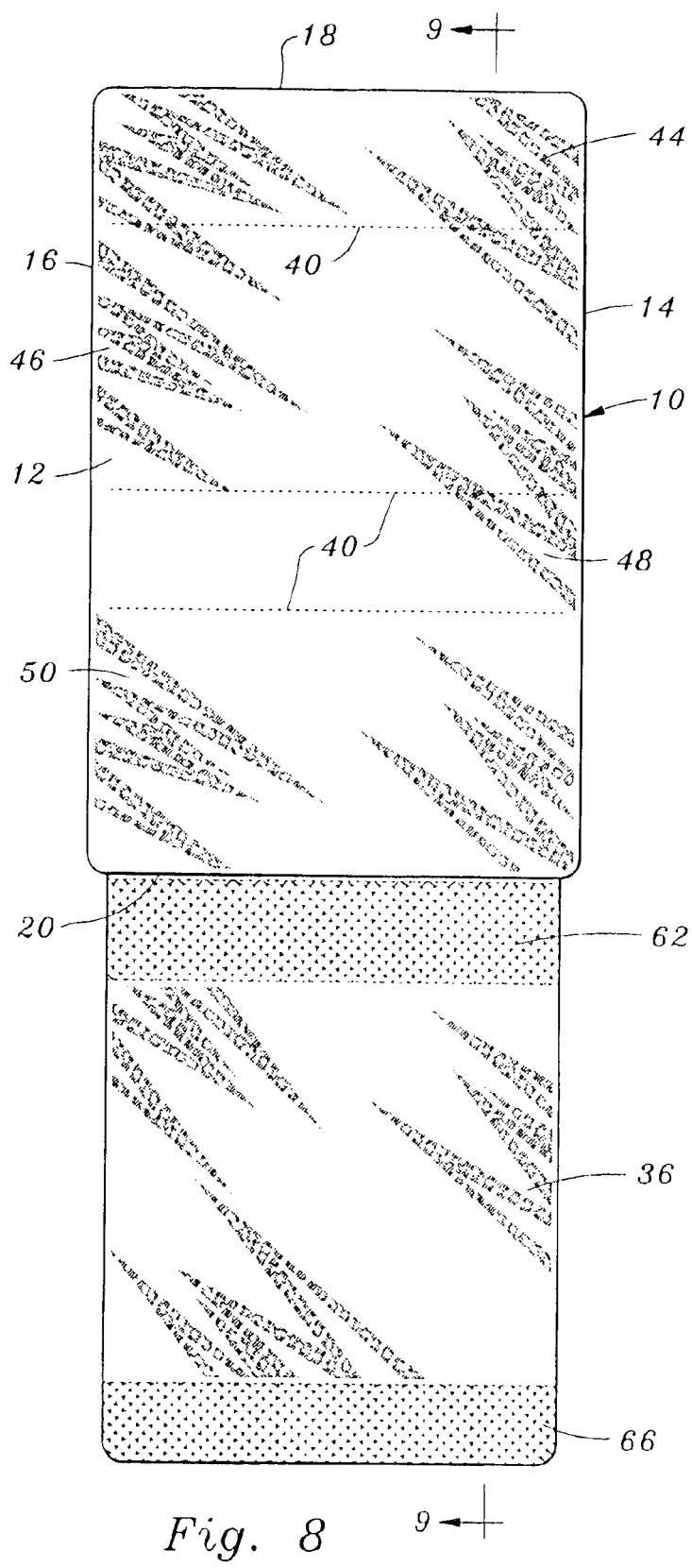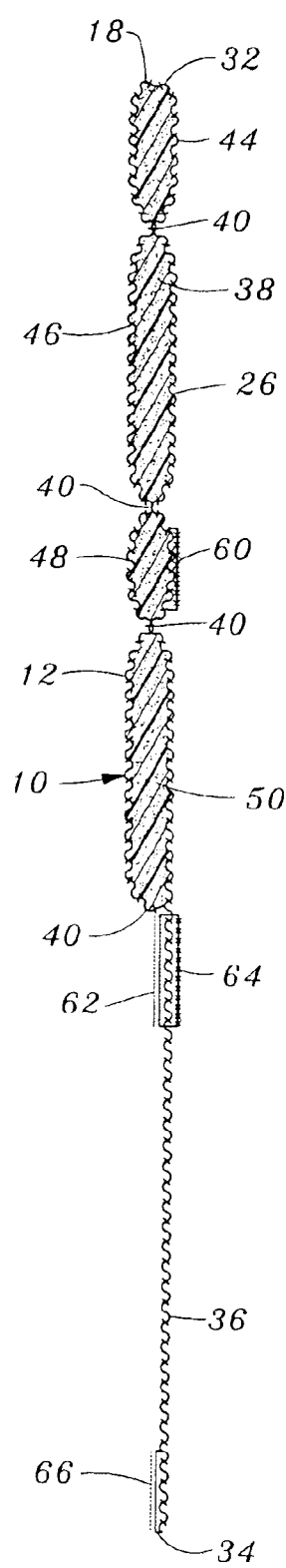
Fig. 8
Fig. 9

ANIMAL LEG WRAP

TECHNICAL FIELD

This invention relates to a leg wrap for wrapping a leg of an animal. The leg wrap is particularly suitable for application to the leg of a horse and can be utilized, for example, to apply medicine, heat, or cold to the horse leg.

BACKGROUND ART

It is well known to wrap horse legs with fabric material for therapeutic and other purposes. Typically, wraps are in the form of fabric strips which are wound about the horse's leg and secured thereto by separate fasteners such as pins, tape, straps, and strings.

These common prior art approaches can actually injure a horse. For example, pins can pop open and scratch or puncture a horse. Tape can break. When this happens, the bandage becomes loose and can be entangled about a horse's leg. Circulation of blood can be cut off, possibly resulting in laminitis. Furthermore, a horse's leg can be abraded and the hair removed. Injury can also result if a horse begins to thrash or struggle to disengage itself from an unravelled bandage.

String is dangerous because it can be pulled too tight by the person applying the bandage or wrap and blood circulation can be impaired or cut off. Strings, tapes, and straps generally are applied horizontally across the horse's tendon, cannon bone and splint bone, causing localized compressive forces encircling the leg.

Prior art animal leg wraps are also often difficult to use and can result in considerable variation in wrap tension in different applications. Many prior art leg wraps also present an unsightly appearance.

The following United States patents are believed representative of the state of the prior art in this field: U.S. Pat. No. 5,152,285, issued Oct. 6, 1992, U.S. Pat. No. 5,107,827, issued Apr. 28, 1992, U.S. Pat. No. 4,685,278, issued Aug. 11, 1987, U.S. Pat. No. 4,538,602, issued Sep. 3, 1985, U.S. Pat. No. 4,424,809, issued Jan. 10, 1984, U.S. Pat. No. 3,882,867, issued May 13, 1975, U.S. Pat. No. 3,822,705, issued Jul. 9, 1974, U.S. Pat. No. 3,667,462, issued Jun. 6, 1972, and U.S. Pat. No. 3,209,517, issued Oct. 5, 1965.

DISCLOSURE OF INVENTION

The present invention relates to an animal leg wrap which can be uniformly and efficiently applied to the leg of a horse or other animal. Tension is applied uniformly along the leg. In addition, the construction of the animal wrap of the present invention ensures that the wrap will be applied in a uniform manner whenever used to provide the desired degree of tension. In addition, the animal wrap of the present invention presents an attractive appearance after application.

The animal leg wrap of the present invention includes an inner wrapping sheet of flexible material of generally rectangular configuration having an inner wrapping sheet top edge, an inner wrapping sheet bottom edge, and spaced first and second wrapping sheet side edges extending between the inner wrapping sheet top edge and the inner wrapping sheet bottom edge.

The leg wrap also includes an outer wrapping sheet of flexible material of generally rectangular configuration having an outer wrapping sheet top edge, an outer wrapping sheet bottom edge, and spaced first and second outer wrapping sheet side edges extending between the outer wrapping sheet top edge and the outer wrapping sheet bottom edge. The inner and outer wrapping sheets are in registry over substantial portions thereof with top and bottom edges thereof in substantial registry.

Soft, resilient filler material is disposed between the inner wrapping sheet and the outer wrapping sheet.

Stitching extends through the inner and outer wrapping sheets and the filler material securing the inner and outer wrapping sheets and the filling material together. The stitching comprises spaced, substantially parallel lines of stitching located between the top edges and the bottom edges of the inner and outer wrapping sheets and substantially perpendicular thereto to define a plurality of substantially rectangular pillows separated by the lines of stitching, the substantially rectangular pillows being elongated and having primary axes. The primary axes are disposed perpendicular to the top edges and the bottom edges of the inner and outer wrapping sheets.

Securement means is provided for securing the leg wrap about the leg of an animal with the plurality of pillows surrounding the leg and a primary axes of the plurality of pillows oriented with the primary axis of the leg and at least some of the plurality of pillows in overlapping condition.

Other features, advantages, and objects of the present invention will become apparent with reference to the following description and accompanying drawings.

BRIEF DESCRIPTION OF DRAWINGS

FIG. 1 is a perspective view illustrating an animal leg wrap constructed in accordance with the teachings of the present invention on each of the front legs of a horse;

FIGS. 2–7 are perspective views illustrating sequential stages involved during application of the leg wrap on and about the leg of a horse;

FIG. 8 is a plan view of one side of the leg wrap prior to its application to the leg of a horse;

FIG. 9 is a cross-sectional view taken along the line 9—9 in FIG. 8; and

BEST MODE FOR CARRYING OUT THE INVENTION

Figure 5:
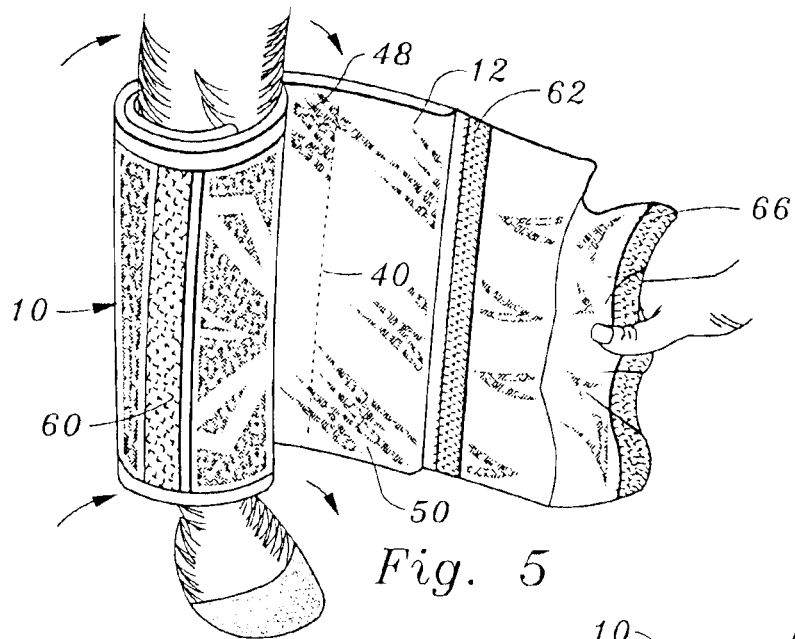

Referring now to the drawings, a leg wrap constructed in accordance with the teachings of the present invention is identified by reference numeral 10. FIG. 1 shows a leg wrap 10 secured in place on each front leg of a horse.

Leg wrap 10 includes an inner wrapping sheet 12 of flexible material such as woven nylon or polyester.

Inner wrapping sheet 12 is of substantially rectangular configuration and has an inner wrapping sheet top edge 14, an inner wrapping sheet bottom edge 16, and spaced first and second inner wrapping sheet side edges 18, 20 extending between the inner wrapping sheet top edge and the inner wrapping sheet bottom edge.

Leg wrap 10 also includes an outer wrapping sheet 26 of flexible material (which may be the same type of flexible material utilized for the inner wrapping sheet) also of substantially rectangular configuration. Outer wrapping sheet 26 includes an outer wrapping sheet top edge 28, an outer wrapping sheet bottom edge 30, and spaced first and second outer wrapping sheet side edges 32, 34 extending between the outer wrapping sheet top edge and the outer wrapping sheet bottom edge.

The top and bottom edges of the inner and outer wrapping sheets are in registry as are inner wrapping sheet side edge 18 and outer wrapping sheet side edge 32. Side edges 18, 32 may be integrally formed at a bight or they may be sewn together.

Figure 10:
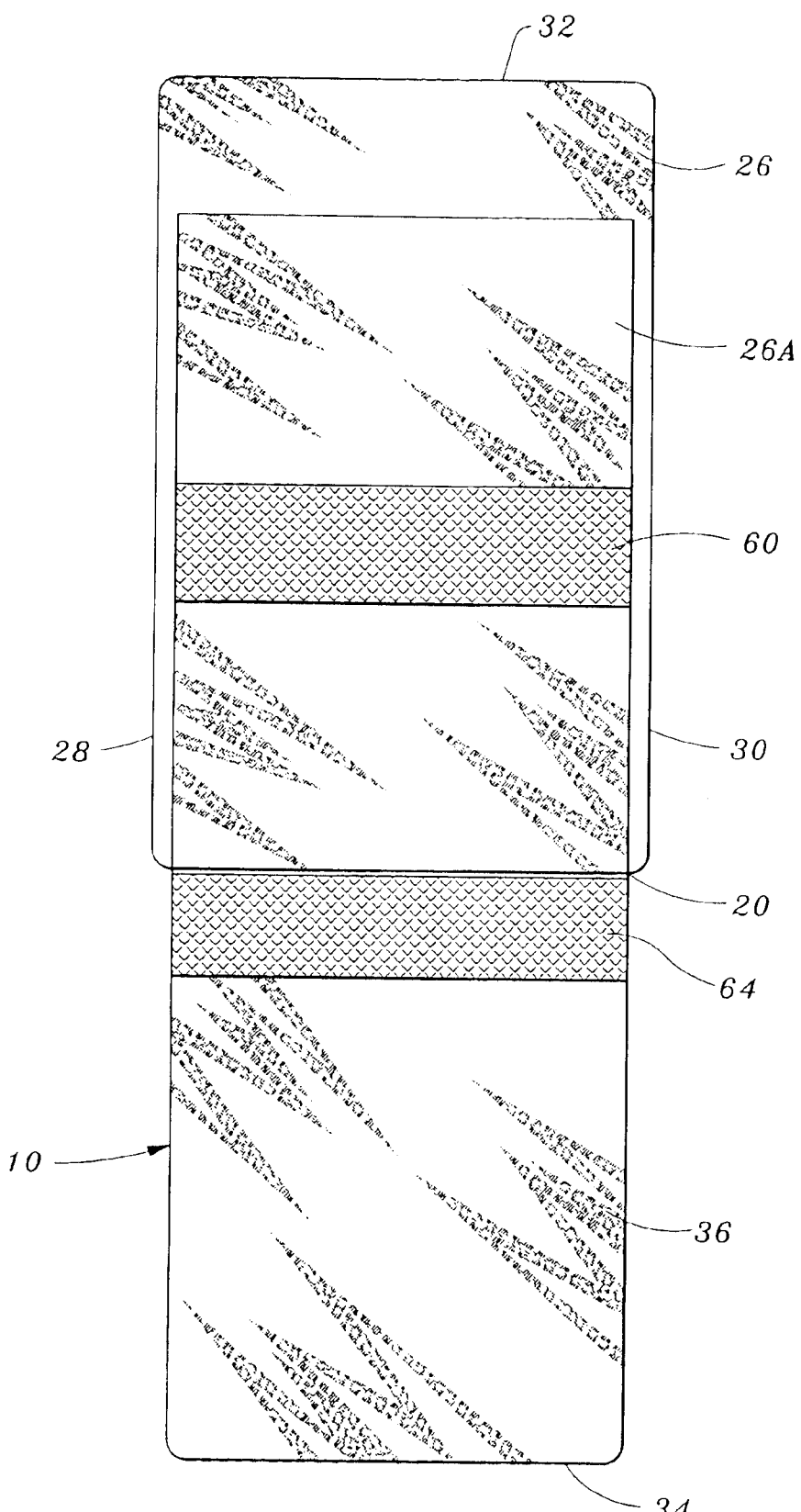
FIG. 10 is a plan view of the other side of the leg wrap prior to its application to the leg of a horse.

The outer wrapping sheet 26 is longer than the inner wrapping sheet 12 and extends beyond inner wrapping sheet side edge 20 to form an outer wrap segment 36 comprising a single layer of flexible sheet material. In the arrangement illustrated, the outer wrapping sheet is of double ply construction over a portion 26A thereof (see FIG. 10). The outer ply (which may be secured to the rest of the outer wrapping sheet in any desired manner such as stitching) extends beyond side edge 20 and forms the outer wrap segment. The outer ply is narrower than the inner ply of the outer wrapping sheet.

Soft, resilient filler material in the form of batting 38 is located between the inner wrapping sheet 12 and the outer wrapping sheet 26 with the batting 38 extending above and below the outer ply of outer wrapping sheet 26 to some extent. Batting 38 may be formed of any suitable material such as raw cotton or wool or synthetic fibrous material.

Stitching extends through the inner and outer wrapping sheets and the filler material to secure the inner and outer wrapping sheets and the filler material together. The stitching includes spaced parallel lines of stitching 40 extending between the top edges and the bottom edges of the inner and outer wrapping sheets and perpendicular thereto. Preferably, stitching (not shown) is applied at the registered top and bottom edges of the wrapping sheets to secure them together.

Four rectangular pillows 44, 46, 48, and 50 are created and separated by the lines of stitching 40. The rectangular pillows are elongated and have primary axes disposed perpendicular to the top edges and the bottom edges of the inner and outer wrapping sheets.

Securement means is provided for securing the leg wrap about the leg of a horse or other animal with the plurality of pillows surrounding the leg and the primary axes of the plurality of pillows oriented with the primary axis of the leg and at least some of the plurality of pillows in overlapping condition.

More particularly, the securement means comprises elongated, narrow securement strips 60, 62, 64 and 66. A particularly suitable securement strip material is touch fastener material such as that sold under the trademark Velcro. The securement strips extend top edge to bottom edge relative to the wrapping sheets. That is, each securement strip has a longitudinal axis extending in the same direction as the lines of stitching 40.

To perform its function properly, the leg wrap 10 is applied in a specific manner to the leg of a horse. FIG. 2 shows the leg wrap being brought into position relative to the horse leg with the inner wrapping sheet oriented toward the leg. In FIG. 3 the relatively narrow pillow 44 (3 inches has been found to be a suitable width) is located against the outer side of the horse's leg over the splint bone. It is to be noted that the lines of stitching and securement strips are oriented parallel to the leg.

Next, the leg wrap is wrapped as shown in FIGS. 3 and 4 to overlap pillow 44 to maintain same in place. The pillow 46 completely covers the tendon, inside splint and cannon bone of the horses leg and holds the first pillow in place.

The third pillow, pillow 48, comes into partial registry with pillow 44 to compensate for the width of the pillow 44 to provide an even distribution of batting about the horse's leg.

With reference to FIG. 5, it will be seen that wrapping of the leg wrap in the manner just described, places securement strip 60 at the outside of the horse's leg. Wrapping is continued until securement strip 62 engages securement strip 60. This orientation and registry of the securement strips 60, 62 ensures that the same tension is applied to the horse's leg every time the leg wrap is used. This is very important because greater or lesser tensioning of the wrap can have potentially harmful effects, such as inefficient treatment or the impeding of blood circulation in the leg.

Figure 6:
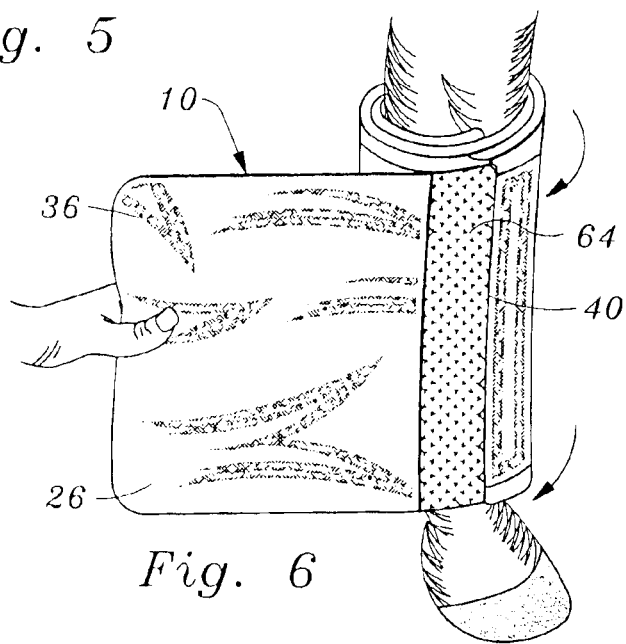
Figure 7:
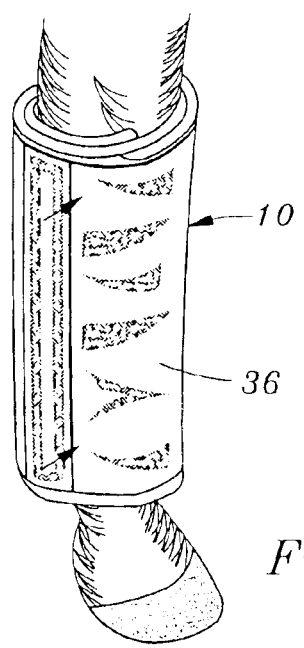

Next, the single layer outer wrap segment 36 is wrapped about the rest of the leg wrap. The distal end of the outer wrap segment 36 is secured in place by engagement between securement strips 64 and 66. Again, this ensures uniform tensioning of the leg wrap every time the leg wrap is applied to a horse's leg. FIGS. 6 and 7 show, respectively, the outer wrap segment 36 being wrapped about the leg and the final configuration of the leg wrap 10 after the outer wrap segment 36 is secured in place.

The fact that outer wrap segment 36 is somewhat narrower provides greater comfort for the horse, the batting above and below outer wrap segment 36 remaining essentially uncompressed.

If desired, monograms or other suitable indicia may be applied to the outside of the outer wrap segment 36. Proper positioning of such indicia will always take place due to the precise, uniform location of the securement strips whenever the leg wrap is used.

The light and durable leg wrap arrangement described above is a considerable advance over conventional prior art approaches which commonly utilized mechanical fasteners of various types which can fall off the wrap itself. With the present arrangement, one never has to worry about losing or misplacing mechanical fasteners. Furthermore, tension is evenly distributed, not localized.

The leg wrap of the present invention readily lends itself to storage. For example, one leg wrap end may be attached to another by the securement strips. Furthermore, one leg wrap may be attached the to another and the leg wraps rolled together to form a compact package for storage or shipment.

What is claimed is:

1. A leg wrap for wrapping the leg of an animal, said leg wrap comprising, in combination:

an inner wrapping sheet of flexible material of generally rectangular configuration having an inner wrapping sheet top edge, an inner wrapping sheet bottom edge, and spaced first and second inner wrapping sheet side edges extending between the inner wrapping sheet top edge and the inner wrapping sheet bottom edge;

an outer wrapping sheet of flexible material of generally rectangular configuration having an outer wrapping sheet top edge, an outer wrapping sheet bottom edge, and spaced first and second outer wrapping sheet side edges extending between the outer wrapping sheet top edge and the outer wrapping sheet bottom edge, said inner and outer wrapping sheets being in registry over substantial portions thereof with the respective top and bottom edges thereof in substantial registry;

soft, resilient filler material disposed between said inner wrapping sheet and said outer wrapping sheet;

stitching extending through said inner and outer wrapping sheets and said filler material securing said inner and outer wrapping sheets and said filler material together, said stitching including spaced, substantially parallel lines of stitching located between the top edges and the bottom edges of the inner and outer wrapping sheets and extending substantially perpendicular thereto to define a plurality of substantially rectangular pillows separated by said lines of stitching, said substantially rectangular pillows being elongated and having primary axes, and said primary axes disposed perpendicular to the top edges and the bottom edges of the inner and outer wrapping sheets; and securement means for securing the leg wrap about the leg of an animal with said plurality of pillows surrounding the leg and the primary axes of the plurality of pillows oriented with the primary axis of the leg and at least some of the plurality of pillows in overlapping condition, said securement means comprising at least two securement strips of releasably securable fastener material affixed to at least one of said wrapping sheets, said securement strips being spaced from one another, each of said securement strips having a strip primary axis and extending between the top edge and the bottom edge of a wrapping sheet with the securement strip primary axis substantially perpendicular to the top edge and bottom edge and substantially parallel to said lines of stitching.

2. The leg wrap according to claim 1 wherein one of said wrapping sheets is longer than the other of said wrapping sheets and extends beyond a side edge of the other of said wrapping sheets and beyond the filler material to form an outer wrap segment for defining an outermost leg wrap convolution about an animal leg when the leg wrap is secured thereabout, at least one of said securement strips being affixed to said outer wrap segment.

3. The leg wrap according to claim 1 wherein said soft, resilient filler material comprises batting.

4. The leg wrap according to claim 1 wherein at least four substantially rectangular pillows are defined and separated by said lines of stitching.

5. The leg wrap according to claim 1 wherein said securement means comprises first and second pairs of securement strips of releasably securable fastener material, the securement strips of each pair of securement strips being in engagement when the leg wrap is secured about the leg of an animal, the securement strips of each pair of securement strips being located at predetermined spaced locations relative to said wrapping sheets, said predetermined spaced locations being selected to provide a desired degree of tension on the leg wrap when wrapped about the leg of an animal.

6. The leg wrap according to claim 5 wherein the predetermined locations of said securement strips are selected to provide engagement between the securement strips of each pair of securement strips at the outer side of an animal leg to which said leg wrap is secured.

7. The leg wrap according to claim 2 wherein the outer wrapping sheet is longer than the inner wrapping sheet.

8. The leg wrap according to claim 5 wherein said securement strips are narrow and elongated.

* * * * *